United States Patent [19]

Smith et al.

[11] Patent Number: 4,478,639

[45] Date of Patent: Oct. 23, 1984

[54] METHOD FOR STEREOSCOPIC PHOTOGRAPHY

[75] Inventors: Edgar C. Smith, Long Island City; James B. Campbell, New York, both of N.Y.

[73] Assignee: Three Dimensional Photography Corporation, Yonkers, N.Y.

[21] Appl. No.: 864,748

[22] Filed: Dec. 27, 1977

[51] Int. Cl.² ............................................. G03C 9/00
[52] U.S. Cl. ...................................... 430/9; 354/112; 354/105; 428/195; 355/22; 430/22; 430/951
[58] Field of Search ................. 96/27 R, 40; 354/105, 354/112, 114, 115

[56] References Cited

U.S. PATENT DOCUMENTS

| 3,518,925 | 7/1970 | Chitayat | 354/105 |
| 3,800,307 | 3/1974 | Wechsler | 354/112 |
| 3,852,787 | 12/1974 | Nims et al. | 354/114 |
| 3,953,869 | 4/1976 | Lo et al. | 354/115 |
| 3,960,563 | 6/1976 | Lo et al. | 96/40 |
| 4,010,481 | 3/1977 | Danko et al. | 354/105 |

Primary Examiner—Travis Brown
Attorney, Agent, or Firm—Jay L. Chaskin

[57] ABSTRACT

An apparatus and method of producing a parallax stereogram, i.e., free vision stereogram, and particularly for the accurate registration of a plurality of film images in order to ensure stereographic reproduction. The images on a film strip are optically viewed to establish homologous points for each film frame image. In one embodiment two images are optically superimposed to establish a stereo base distance. Each film frame is marked in accordance with the homologous points or stereo base distance. The marking may be mechanical or optically generated. Each film frame is thereafter aligned or sensed while in an enlarger, the marks establishing the accurate registration of eaach frame. Each film frame is exposed onto a photosensitive material using a movable line grid. A lenticular screen is superimposed over the developed picture to form the stereoscopic photograph.

62 Claims, 21 Drawing Figures

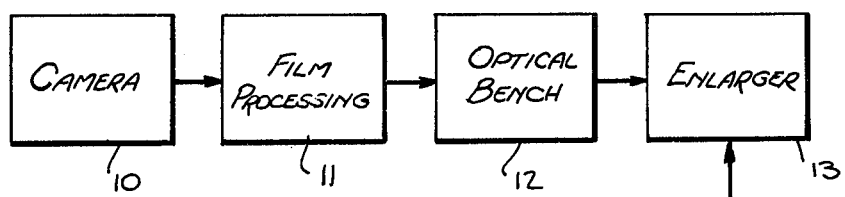
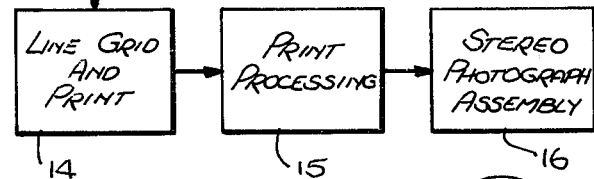
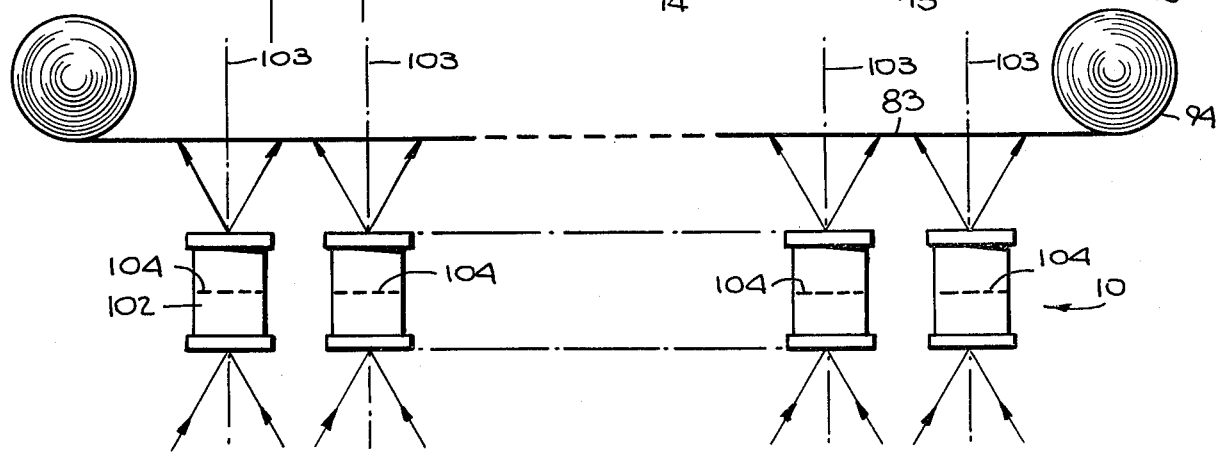
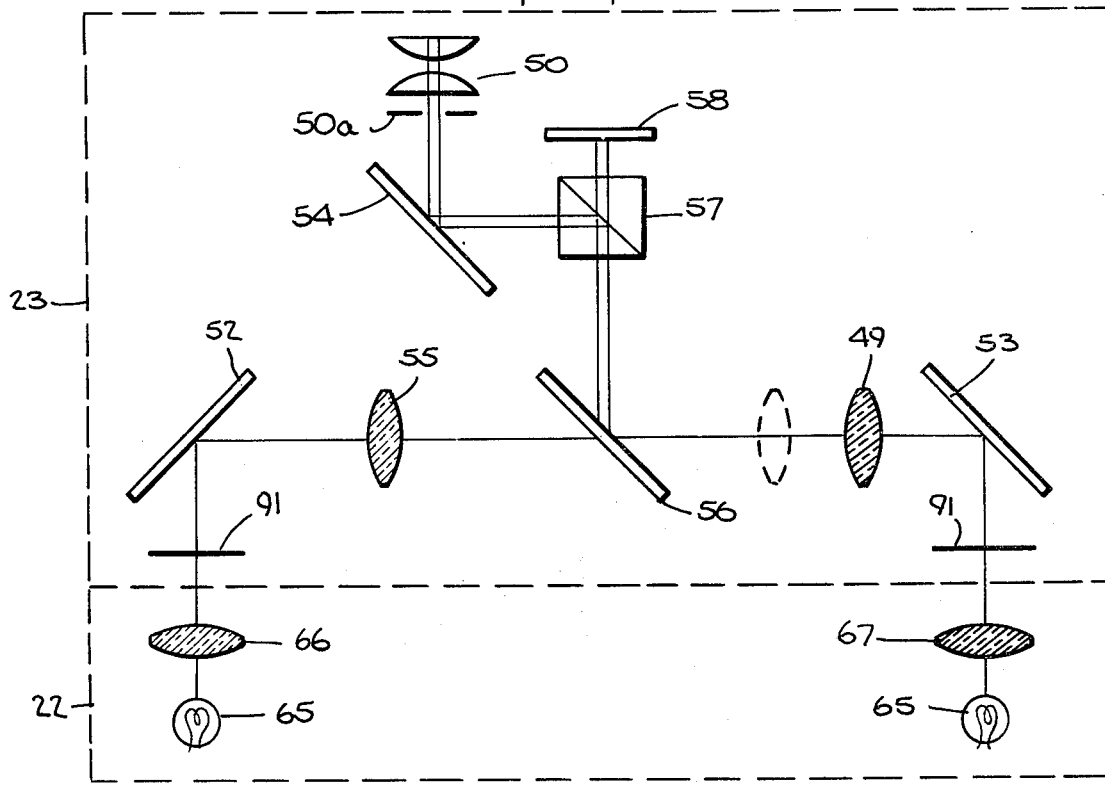

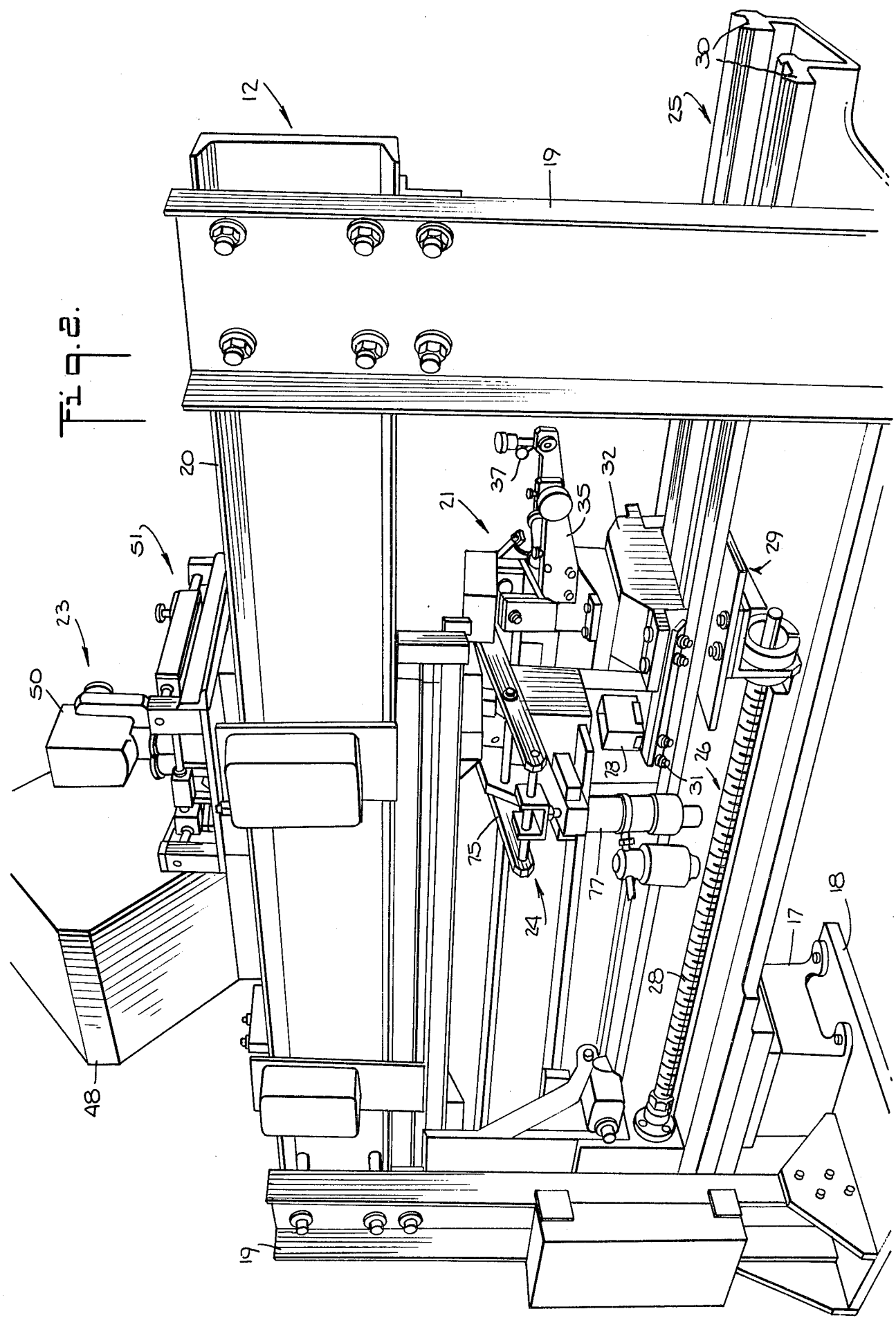

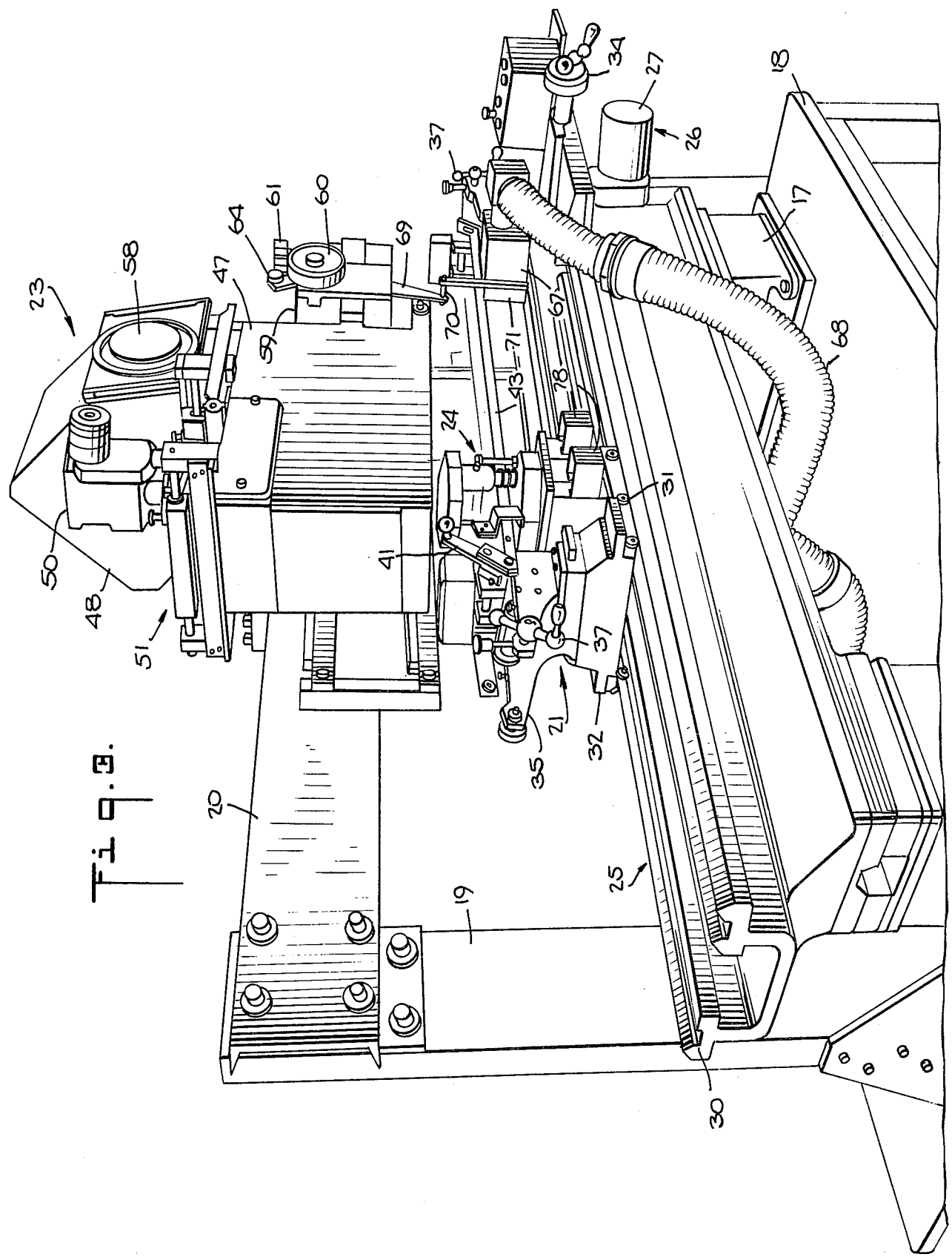

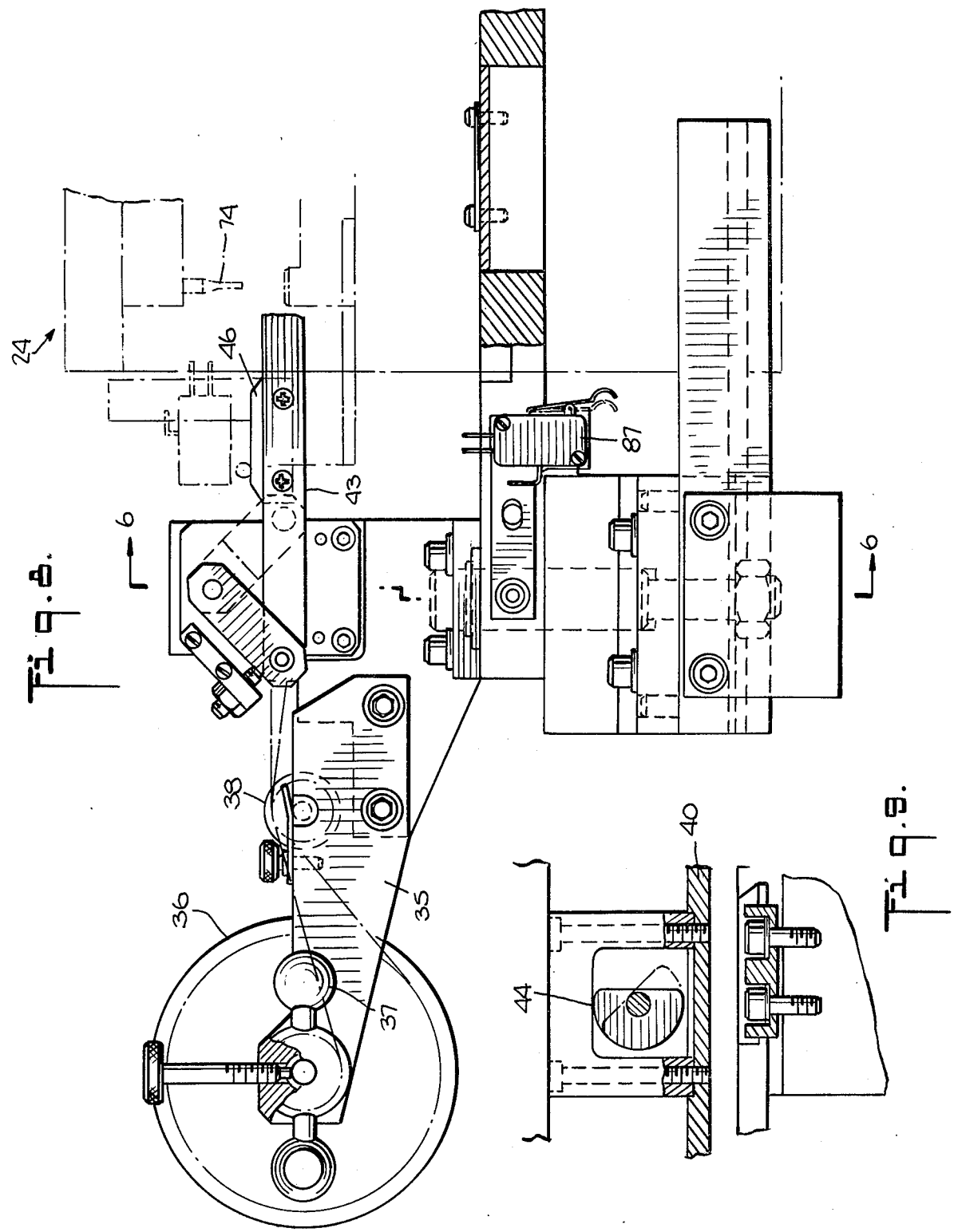

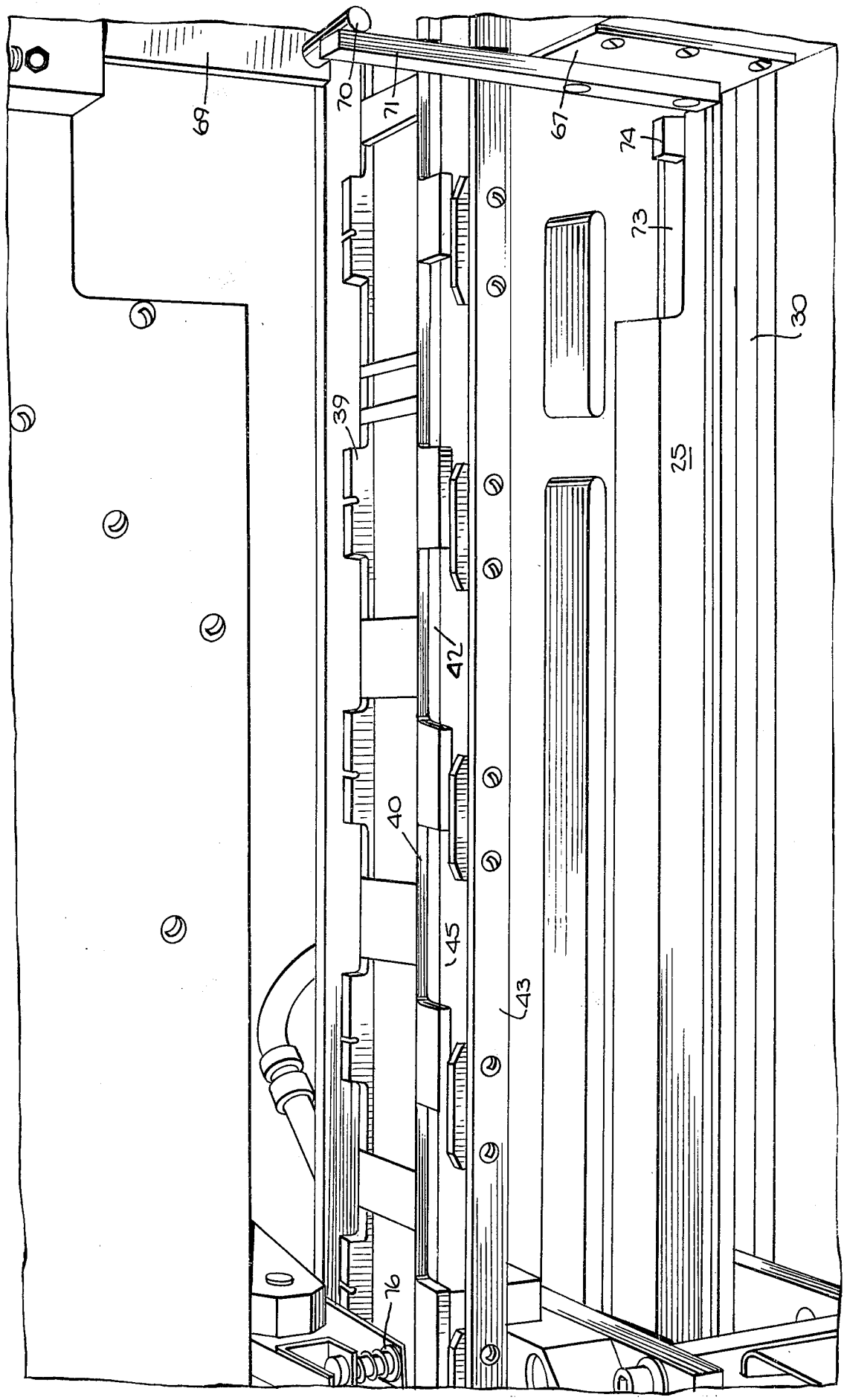

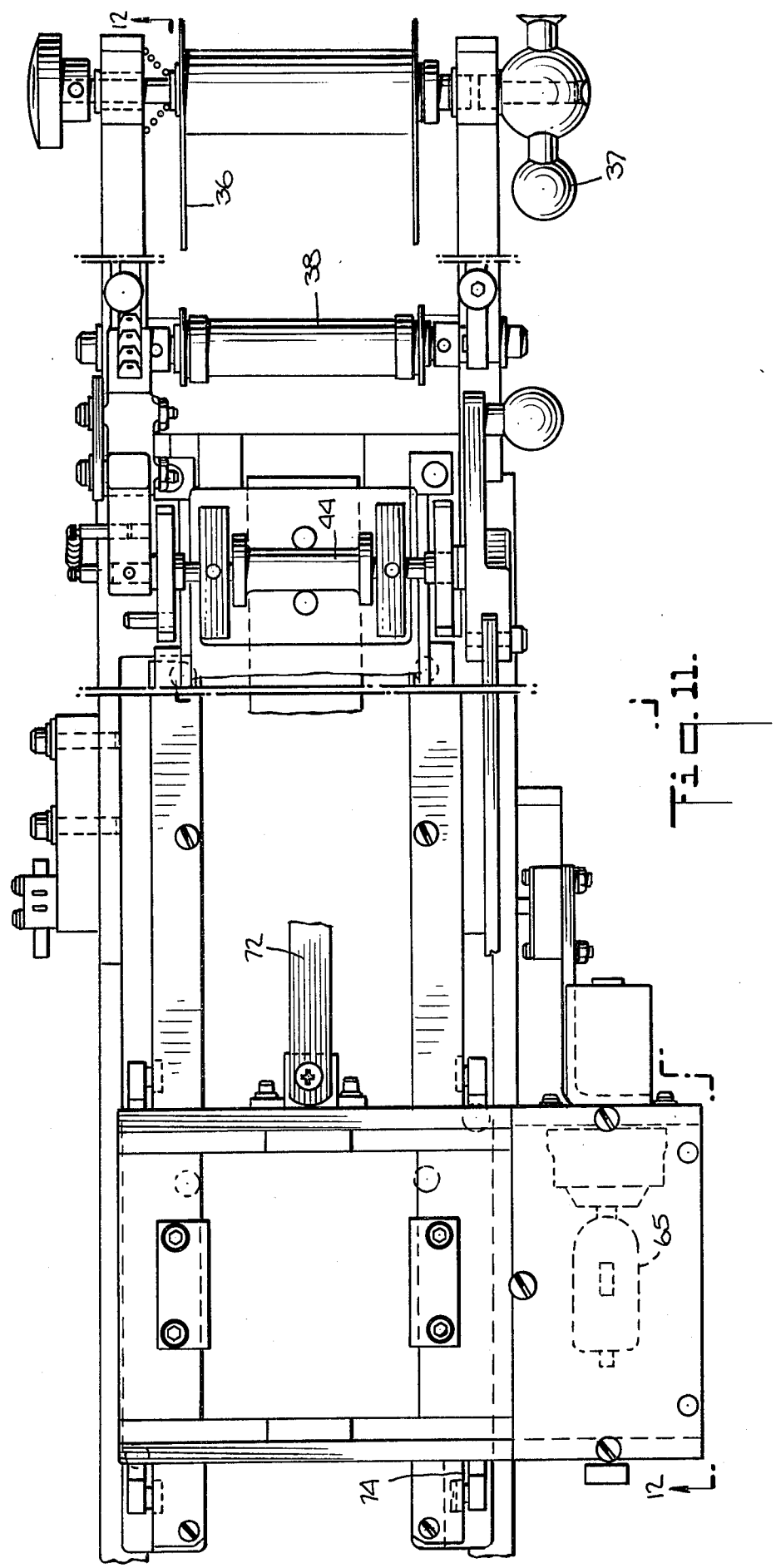

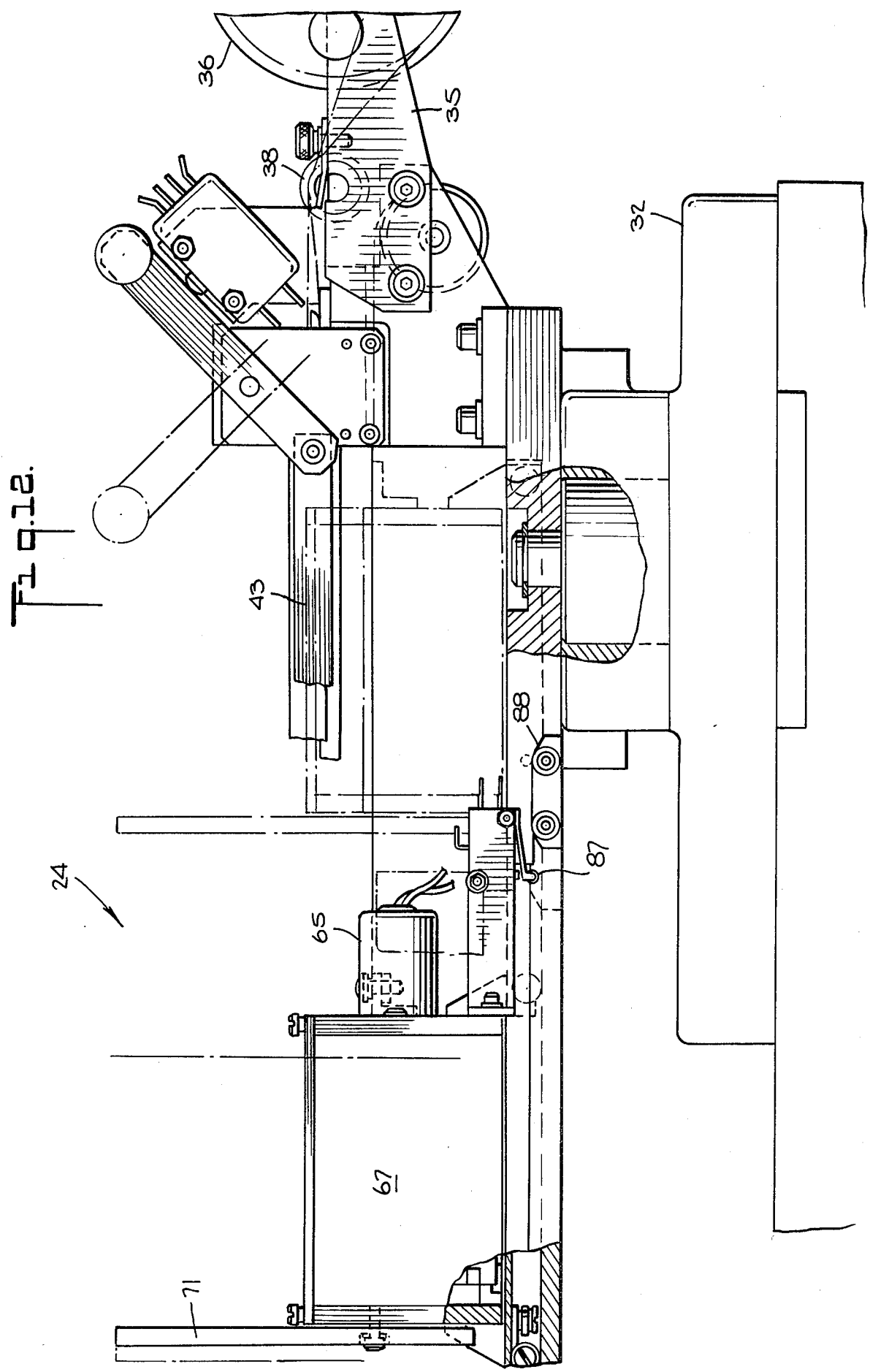

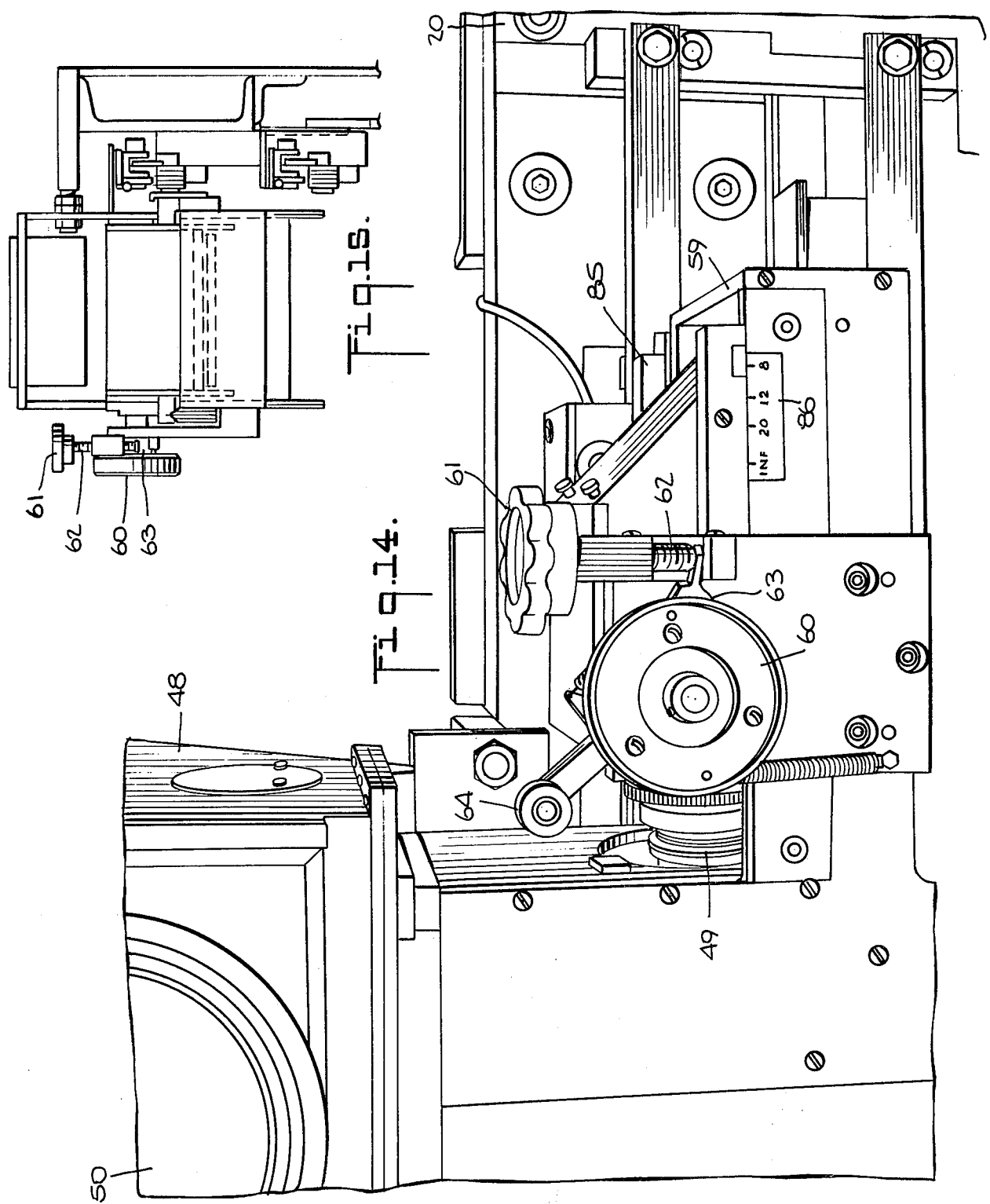

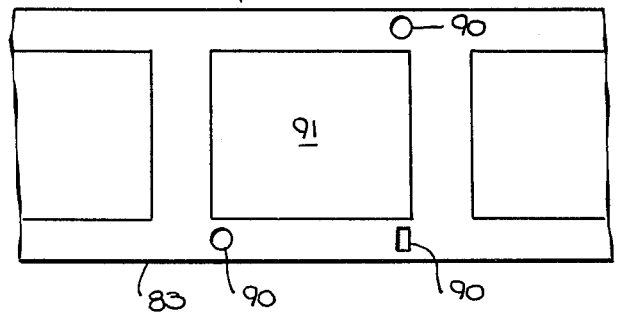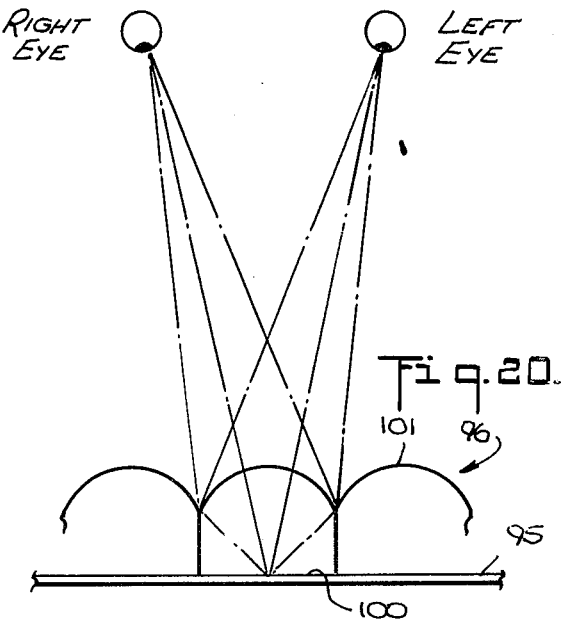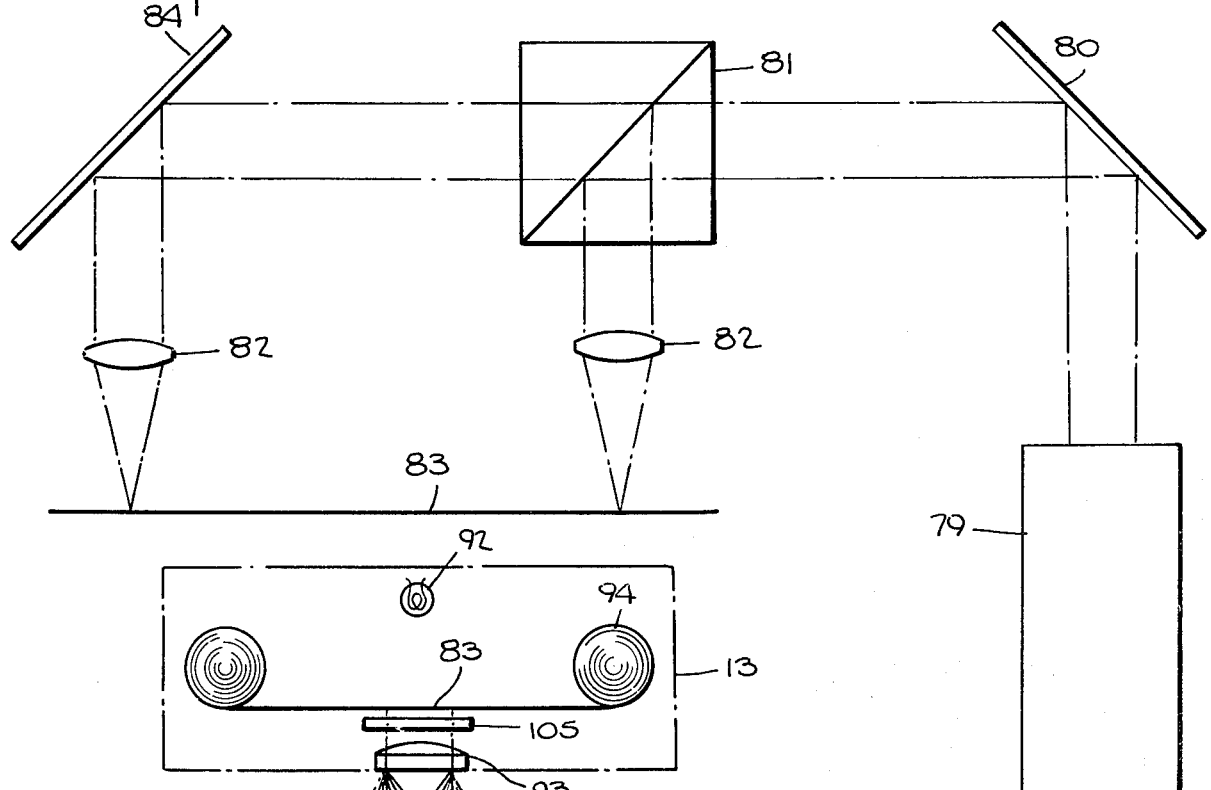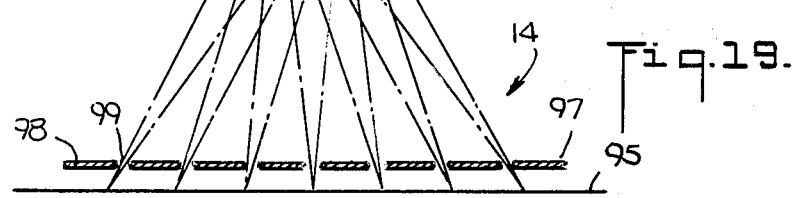

METHOD FOR STEREOSCOPIC PHOTOGRAPHY

BACKGROUND OF THE INVENTION

This invention is directed to an apparatus and method for photography and more particularly to an apparatus and method for providing stereographic photographs.

Stereoscopy has been found useful and successfully applied in a wide variety of scientific and technical areas as well as in commercial, professional and amateur photography. While ordinary photographs may be pleasing the stereophotograph makes the scene come to "life."

Stereoscopy is the visual perception of the three-dimensional space surrounding us by the reproduction of images giving the impression of spatial extent and solidity of the objects portrayed. In the human physiological and psychological sense the mind combines the images viewed from both eyes forming the perception of a three-dimensional scene. Artificially the means of reproducing stereoscopic images should desirably be accomplished without the use of particular or individual optical devices, e.g., an anaglyphic viewer. Furthermore the viewing of artificially produced stereoscopic images should produce integral spatial images, i.e., not only should the images be viewed stereoscopically, but they should be seen from all possible viewpoints so as to present different spatial aspects. The optical spatial image may be artificially created in the mind of the observer without any objectively real construction of a three-dimensional image. For example, if each eye views a flat picture photographed from the right and left eye viewpoints then in the observer's mind the two images will combine to create the spatial image. The stereoscopic image created from the flat photograph can be enhanced considerably as well as directly influenced by such factors as color; contrast; apparent sense of depth perception; the type, source and direction of illumination; shading; brightness of the object; definition within the photograph, e.g., sharp or ill-defined edges or borders; object shape; viewing angle; variations in human vision and the observer's familiarity with the objects being viewed.

One technique for reproducing spatial images is the use of lenticular or fine raster screens. The images are integrated by the screen by optically combining the elementary image planes received by the raster system. Each lens component of the screen is the objective lens for a small element of the image, the integration or composite of all such lenses when viewed with both eyes produces a spatial image effect. The small element of the image is provided by a corresponding screen which permits only the printing of that element on the sensitive film. The sensitive film itself may have individual lens components.

A photographic stereogram may be prepared by several methods: (1) a photograph taken with a conventional camera having a single objective and moving it or the object to successive viewpoints; or (2) a photograph taken with a camera having a single objective and an optical stereo attachment which enables two photographs of an object to be taken simultaneously from two viewpoints or (3) a photograph of an object with a camera having two objectives whose separation is equal to the normal stereoscopic base of approximately 65 mm. A combination of any of the foregoing methods may also be used. Each of the photographs is photographically broken up into a series of narrow strips representing alternatively the picture of the left and right stereogram.

In each of the above techniques the stereoscopic effect is directly related to the accuracy of superimposition of a plurality of images or the optical integration of a plurality of portions of an image. It is therefore seen that the registration of the images for purposes of viewing or printing is of considerably importance.

Furthermore in each of the above methods the single or multiple camera objectives are directed to an aim point. The aim point is the point of convergence of the lenses in a multi-objective lens camera or the center of arc of a single lens camera which rotates around the subject or the center of rotation of the subject which rotates during the camera exposure. The aim point is a vertical line within the image that will be at the rear surface of the lenticular screen when the finished picture is viewed. The aim point is therefore established and fixed before or when the photosensitive material is exposed. After exposure the aim point cannot be changed or adjusted.

SUMMARY OF THE INVENTION

It is an object of the present invention to provide an apparatus and method for the stereoscopic reproduction of photographic images.

It is an object of the present invention to provide an apparatus and method for the accurate registration of a plurality of photographic images in order to have stereographic reproduction.

It is an object of the present invention to provide an apparatus and method for establishing or adjusting the aim point after the photosensitive material is exposed and processed.

It is a further object of the present invention to provide an apparatus and method for the projection printing of a continuous film strip in order to produce a stereoscopic photograph.

It is still a further object of this invention to provide an apparatus and method for the marking of a film strip and to use such marking to accurately align each film image to produce a stereogram.

It is yet another object of the present invention to provide a complete apparatus and method for the production of stereoscopic photographic pictures without the need for individual viewing devices.

It is still a further object of this invention to provide an apparatus and method for the production of multiple stereoscopic prints of the same pictures without the customary use of lithography or other graphic arts methods.

In accordance with the invention, the method comprises the steps of providing a plurality of film frame images of the same subject; determining homologous points for each film frame image; marking each film frame image with a mark according to the homologous points; using the mark to sequentially locate and position each film frame for exposure and mounting the print in an optical viewer. The plurality of film frame images is made by a multi-objective lens camera to provide a continuous film strip. As used herein "homologous points" is defined as the two point images in the stereo pair which exactly correspond.

In one embodiment the desired aim point is selected by optically superimposing on a first film frame image a position adjustable cross-hair; fixing the location of the cross-hair and marking the film frame. The homologous points for each successive film frame image are registered by placing each film frame image optically under the cross-hair. Each film frame is successively marked. In another embodiment two film frame images are optically superimposed to establish a stereo base distance. The desired stereo base is determined by the optical visual comparison of superimposing preferably the first and last film image frame. The optical image can be varied so as to select a desired aim point. The stereo base is the distance between a selected point on the first and last film frame, i.e., the homologous points, and establishes the aim point. Each film frame image is marked at a plurality of locations by dividing the stereo base distance by the number of frames less one. The marking means may be optical or mechanical means. The film strip is inserted into an enlarger and aligned according to the marks on each film frame. A portion of each film frame is sequentially printed onto photographic material, the portion being determined by a movable line grid. The material is processed to produce a positive picture. The stereoscopic effect is provided by a lenticular screen superimposed and maintained in registration as by lamination with the picture.

BRIEF DESCRIPTION OF THE DRAWINGS

While the specification concludes with claims which particularly point out and distinctly claim the subject matter regarded as the invention herein, it is believed that the invention will be better understood from the following description thereof taken in conjunction with the accompanying drawings, in which:

FIG. 1 is a block diagram showing the general flow sequence of the present invention;

FIGS. 2 and 3 are partial perspective views of the overall optical bench;

FIG. 8 is a partial schematic side view of the carriage assembly means of FIG. 5;

FIG. 9 is a partial cross-sectional view of FIG. 6;

FIG. 10 is a partial perspective view of the film support means;

FIG. 11 is a partial elevation view of another end of the carriage assembly means;

FIG. 12 is a partial side view of the carriage assembly means of FIG. 11;

FIGS. 14 and 15 are partial perspective views of a portion of the upper optical section;

FIG. 16 is a schematic view of the operation of the upper and lower optical sections;

FIG. 17 is a partial schematic of a film image frame showing the registration marks;

FIG. 18 is a schematic of an optical means for generating the frame registration marks;

FIG. 19 is a partial schematic of the enlarger and line grid for the printing of the film image;

FIG. 20 is a partial schematic of the assembled stereoscopic photograph showing the lenticular viewing screen.

FIG. 21 is a partial schematic of a camera suitable for use in the apparatus and method of this invention.

DETAILED DESCRIPTION OF THE INVENTION

Figure 4:
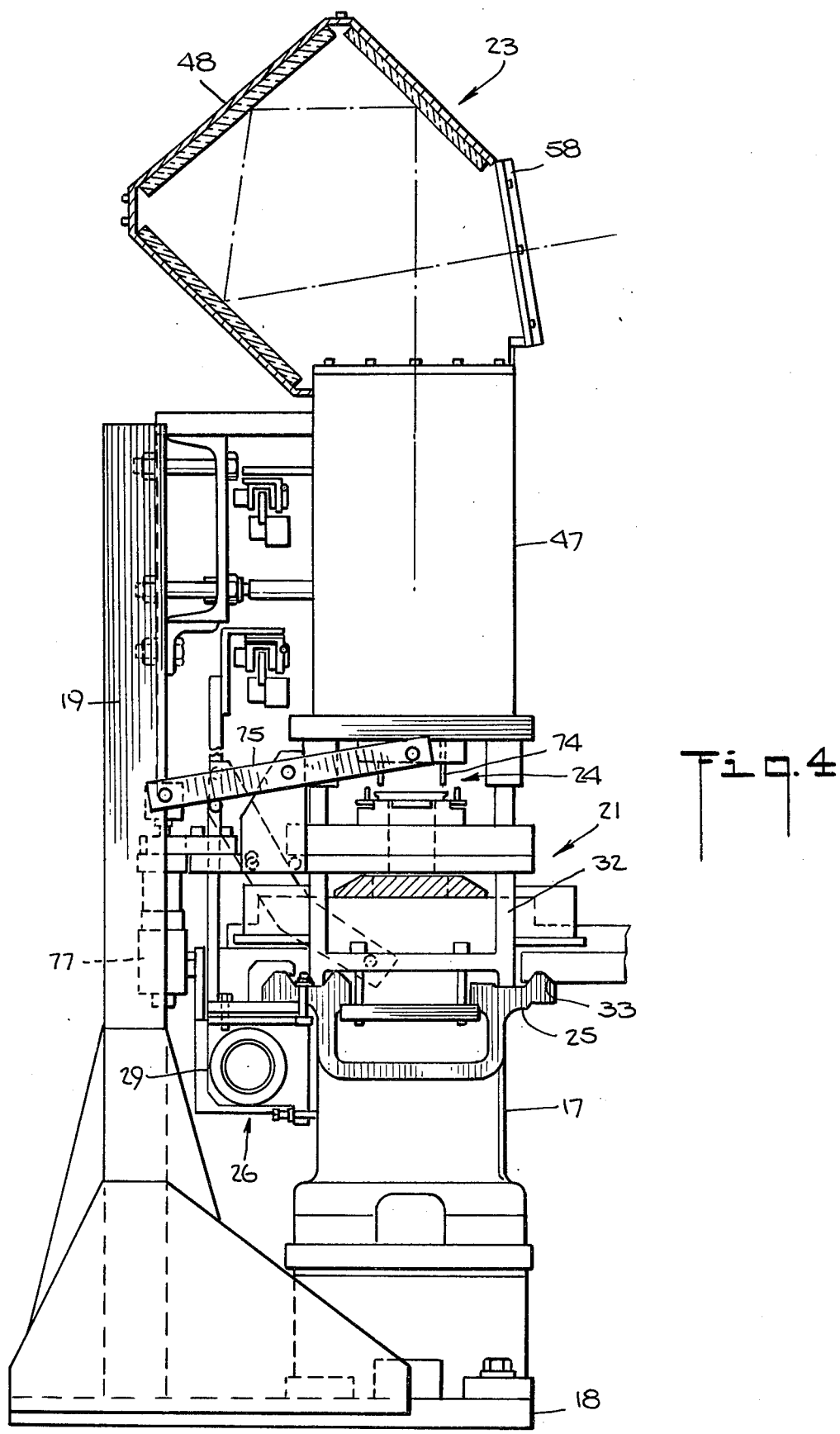
FIG. 4 is an end view in partial section of the optical bench.
Figure 5:
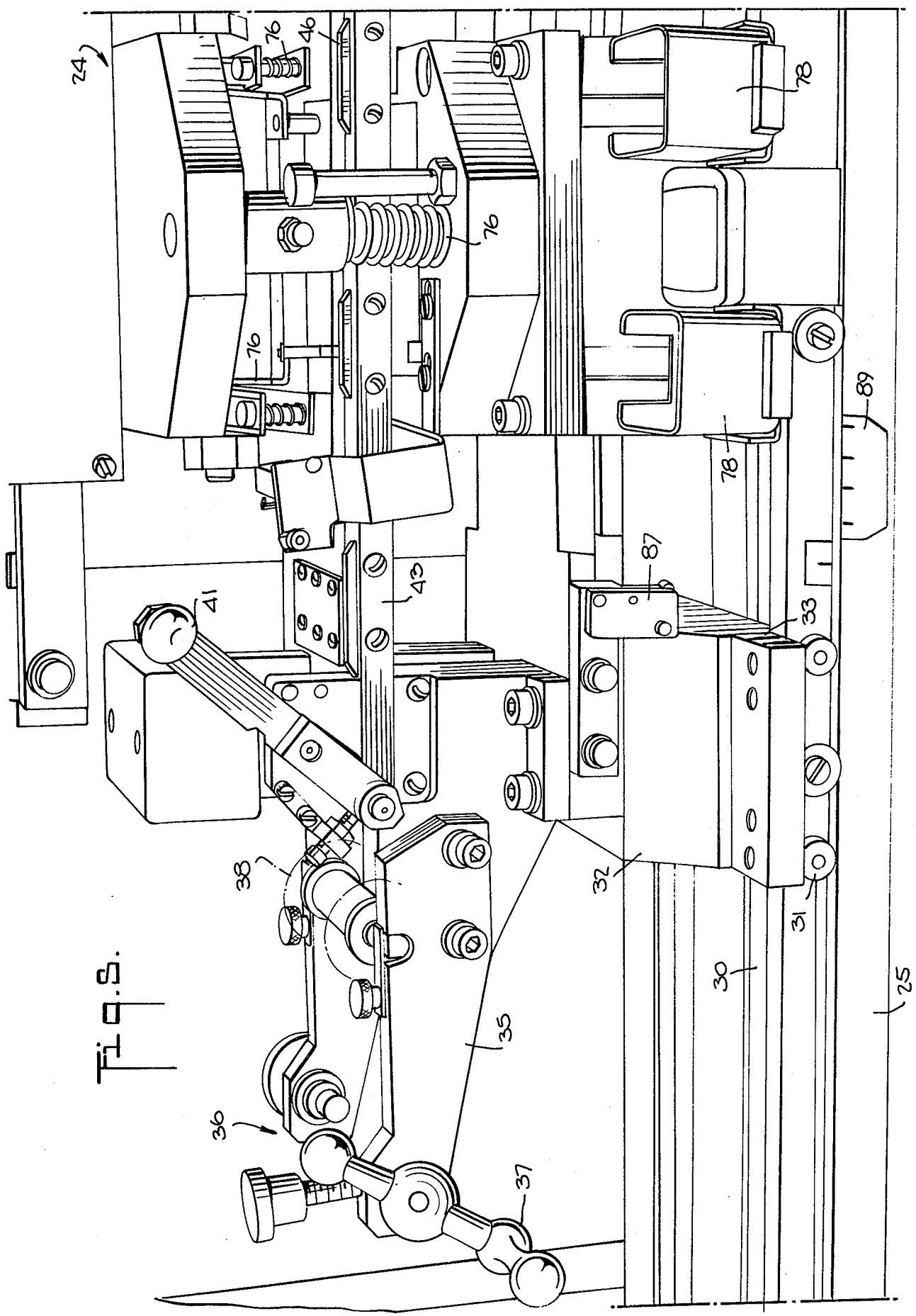
FIG. 5 is a partial perspective elevation view of one end of the carriage assembly means of the optical bench.

Referring to the drawings, FIG. 1 shows in a block diagram generally the sequential steps of the method for producing a stereoscopic photograph. A camera 10 provides a plurality of film images of the subject on photographic material. The photographic material is processed at 11 in the usual manner for use in the optical bench 12. In the optical bench 12 the film comprises preferably a continuous strip of a plurality of film images of the same subject. At least two film images are optically viewed at the optical bench to determine homologous points for each film image and each film frame is marked for subsequent registration in the enlarger 13. Each of the marked film frames is sequentially inserted in the enlarger 13 wherein mechanical or optical registration means aligns the film image for projection onto a line grid and photographic paper 14. The photographic paper is thereafter processed at 15 to produce a positive picture. A lenticular screen is assembled at 16 to overlie the positive picture to form a stereographic reproduction of the photographed subject.

Figure 6:
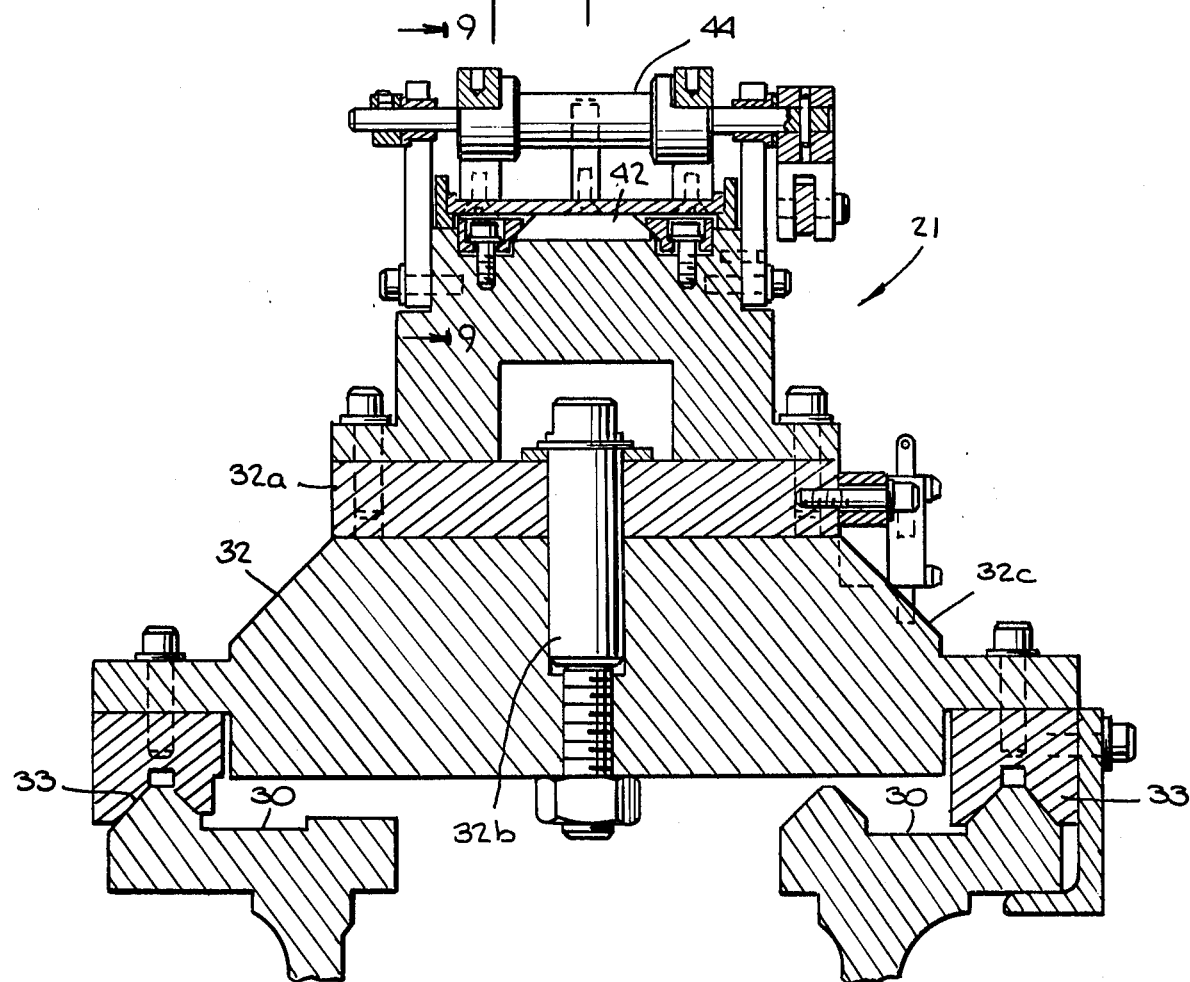
FIG. 6 is a cross-sectional partial view of the carriage assembly means of FIG. 5.
Figure 7:
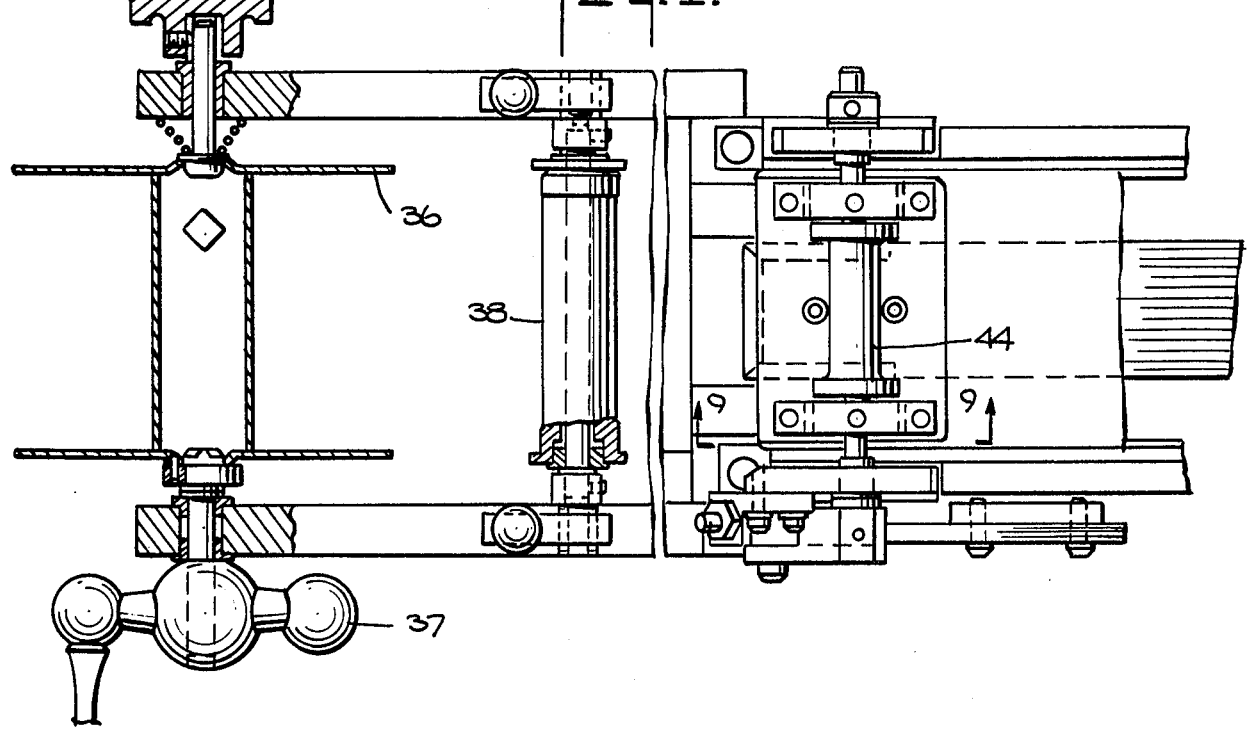
FIG. 7 is a partial elevation view of the end of the carriage assembly means of FIG. 5.

Referring to FIGS. 2 to 4 the optical bench 12 comprises stable means 17 securely mounted to a base 18. The stable means 17 comprises two vertical supports 19 and a horizontal support 20 extending between the vertical supports. The stable means 17 supports a carriage assembly means 21, the carriage assembly means 21 being movable on the stable means 17 and supporting the film image frames. The stable means 17 also supports lower section optics 22 (to be described in FIGS. 13 and 16) which cooperate with upper section optics 23 (to be described in FIGS. 15 and 16) supported by the vertical and horizontal supports 19 and 20. Lower and upper section optics comprise optical means for the optical viewing of the film image frames for establishing homologous points on each frame. The carriage assembly means 21 is horizontally advanced or retracted on a table 25 by a programmed mechanical or electro-mechanical means 26 so as to allow a plurality of marks to be placed on each film frame image sequentially. The programmed mechanical or electro-mechanical means 26 can be a synchronous stepping motor 27 rotatably driving a worm gear 28 through an appropriate motor gear drive. The worm gear 28 is affixed at one end to the carriage assembly means by a bracket assembly 29 which passes through a slot in the table 25 and to the underside of the carriage assembly. The motor 27 is supported by the table 25. The table 25 further supports optical means (FIG. 19) or mechanical means 24 for causing a mark to be placed on each of the plurality of frames as the carriage assembly means 21 is moved. The table 25 is a horizontal surface having machined grooves 30 which extend the length of the table. The carriage assembly means is mounted on a plurality of rollers 31 which slide on the machined grooves 30. A plurality of rollers 31 are located at an end of a carriage 32 which supports the stepping motor 27 and a plurality of rollers are located at an end of the carriage 32 to which is attached the bracket assembly 29. In addition to the rollers 31, the carriage 32 has complimentary grooves 33 (FIG. 6) which slidably engage the grooves 30 of the table 25. Extending from the motor end of the carriage assembly means is a hand wheel 34. Hand wheel 34 is a manual control for adjusting the vertical position of the projected images by pivoting the carriage assembly means. The pivoting adjustment compensates for any displacement in the film images caused by the camera 10 being out of level in a horizontal plane while the film is being exposed. Adjustment is accomplished by pivoting upper carriage 32a about pivot 32b. Pivot 32b is located generally at the end of the carriage assembly means opposite that of hand wheel 34. Pivot 32b joins the upper carriage 32a with a lower carriage 32c to form the carriage 32.

Referring to FIGS. 5 and 7 to 12 extending from a bracket 35 on each end of the carriage 32 is a respective film storage or take-up spool 36 and manual means 37 for rotating each spool. An idler film roller 38 guides the film on and off a respective spool. Extending generally between the spools 36 is a film support means comprising a film guide 39, a film pressure plate 40, a film pressure clamp 41 and a transparent, for example, glass, member 42. The film extending between spools 36 is located vertically spaced from and under the film pressure plate 40, overlying the transparent member 42. The film pressure clamp 41 raises and lowers a clamp arm 43 attached to a side edge of the film pressure plate 40. The operation of the clamp 41 causes the rotation of a cam 44 which in an open position (shown in full line in FIG. 9) raises the film pressure plate 40 and maintains the plate 40 vertically spaced from the film. In the closed position (shown in dotted line in FIG. 9) cam 44 permits the film pressure plate 40, which lies over the film, to be urged against the film. The urging of the plate 40 against the film can be by causing the cam 44 to press the plate 40 downwardly or by releasing a spring tension or simply by freely releasing the plate to lie over the film. The film, in turn, is pressed against the transparent member 42. The film pressure plate 40 is a transparent member having slots 45 along its parallel edges. The slots 45 permit the mechanical or optical marking means to engage the film. The clamp arm 43 has a plurality of spaced cam-like surfaces 46 extending along the longitudinal length of the arm. When in the clamped or engaged position such that the pressure plate 40 is urged against the film, each cam-like surface is rotatably moved opposite a respective slot 45. Located along the length of the other side edge of the film pressure plate is a film guide 39 to prevent the lateral movement of the film as it removed or wound from each spool 36 or as the carriage assembly 21 moves.

The optical means (FIG. 16) comprises a lower section 22 and an upper section 23 optics. The upper section optics 23 is fixedly secured to the horizontal support 20. The upper section optics comprises two optical enclosures 47, 48; a movable stereo base lens 49 and an eyepiece 50. The eyepiece 50 is mounted in a framework 51 which permits the eyepiece to be fixedly adjusted in two directions in a horizontal plane. Optical enclosure 47 contains a plurality of reflecting mirrors 52, 53, 54; a lens 55; and first and second optical beam splitters 56, 57. Optical enclosure 48, which is supported by optical enclosure 47, contains viewing screen 58 which may be ground glass or of fiber optics. In FIG. 4, additional reflecting mirrors are shown in the enclosure 48 in order to correct the orientation of the image shown on the screen 58. Referring to FIGS. 14 and 15 the stereo base lens 49 is mounted in a frame 59 extending from optical enclosure 47. The stereo base lens 49 is horizontally movable within the frame 59 by two hand wheels 60 and 61. Lens 49 is prefocused to the film plane at the time of bench assembly. Hand wheel 60 permits the coarse horizontal movement of the lens 49 by a suitable gear interconnecting the lens and the frame. Hand wheel 61 has a screw 62 which engages follower 63 attached to the lens 49. Hand wheel 61 permits the fine horizontal movement of the lens 49 for precise optical alignment. A locking arm 64 extends from an interconnection between the lens 49 and frame 59 for locking the lens 49 in the desired horizontal position for the homologous points. The horizontally movable stereo base lens 49 permits the optical superimposing of two film frame images and establishes the center-to-center distance of the chosen aim point for the superimposed images.

Figure 13:
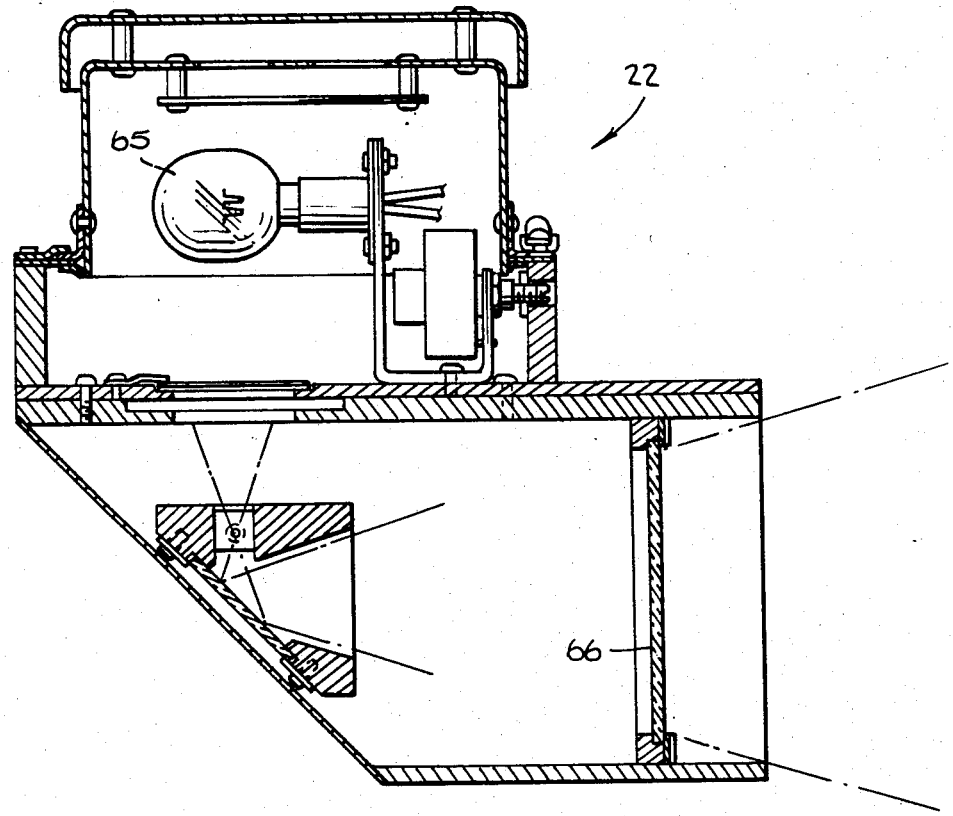
FIG. 13 is a partial cross-sectional view of a portion of the lower optical section.

Lower section optics 22 shown in FIGS. 13 and 16 comprise an optical source 65 for projecting through a respective lens 66, 67 a film image to the upper section optics 23. FIG. 13 shows a preferred arrangement of the lower section optics 22 for either the selected or first frame or the second or last frame. Lens 66 projects the image of a selected frame or the first frame of a selected pair of frames from the plurality of film frame images. Lens 67 projects the image of the second or last frame of a selected pair of frames from the plurality of film frame images. Lenses 66 and 67 are each cooled by a flexible tube 68 connected to a blower (not shown).

Referring to FIGS. 3 and 10 extending downwardly from the lens 49 is an arm 69 with a projecting pin 70. Pin 70 engages with a strut 71 which extends from the housing of lens 67. The pin 70 moves lens 67 horizontally with the horizontal movement of lens 49. Strut 71 is urged against pin 70 by a leaf spring 72 which is attached to the carriage assembly 21 adjacent one end of the film pressure plate 40. Table 25 has a longitudinally extending slot 73 into which projects a lens guide 74 for the linear movement of lens 67.

The film frame marking means 24 provides marks on the film frame which permit the subsequent registration of each image during the printing step. The marks are caused by the removal of a portion from each frame or by affecting the optical density differential of each frame. The marks can be effected mechanically, as by a punch, or optically, as by a focused laser. In the apparatus shown in FIGS. 2 to 15 mechanical punches 74 are shown. An alternative optical means is shown in FIG. 18. In FIGS. 2 to 15 there is shown a lever mechanism 75 which causes the punches 74 to move downwardly and mark the film frame. The punch 74 is urged out of engagement with the film frame by springs 76. The lever mechanism 75 is actuated by a conventional drive, for example, a fluid actuated piston and cylinder 77. The operation of the mechanical punches 74 causes the removal of a selected portion of the film frame. Extending vertically from a centrally disposed inward portion of the table 25 is a frame for supporting a plurality of film punch punch catchers 78. As shown in FIG. 2 a single punch catcher is on one side of the film while the other side has two horizontally spaced apart punch catchers. In FIG. 18 the optical beam of a laser 79, preferably having a wavelength of 0.7 to 0.3 microns, is reflected from a mirror 80 to a beam splitter 81. Beam splitter 81 divides the optical beam into two beams which are directed onto the film 83 through lenses 82. One of the two divided beams is directed to the film by a mirror 84. The laser removes a selected portion of the emulsion layer from the film frame or adds to the optical density of a portion of the emulsion layer. The markings 90 on the film 83 whether optically or mechanically formed are representatively shown in FIG. 17. The markings may be arranged in a different orientation, size, shape or location relative to the image on the frame or to each other. The orientation, size, shape or location differentiation permits the recognition of the correct registration for each film frame 91 by a mechanical means or optical sensor during the printing step of each image.

In order to actuate various features of the apparatus and to carry out the steps of the method, the apparatus includes selective electrical switches, instruments, monitoring means, measuring scales and protective mechanical and electrical features. By way of example the position of lens 49 is detected by an electrical switch 85 operatively engaged with the interconnection between the lens 49 and the frame 59. The approximate stereo base is visually determined by the scale 86. At each end of the carriage assembly 21 is a microswitch 87 which engages a switch cam 88 on the table 25 for detecting the limits of horizontal movement of the carriage 32. A visual indication of a position of the carriage assembly 21 is given scale 89. Various other mechanical, electrical and electro-mechanical devices or combinations thereof which are desirable for the control and operation of the apparatus and method can be provided and understood by one skilled in the art.

In order to determine the stereo base position of the film 83, a frame of the film is respectively projected through each lens 66, 67 of the lower section optics 22. The image frame 91 projected through the lenses are the first and last frames of the image sequence. The image of the first and last frames are projected to the upper section optics 23 located in the two enclosures 47, 48. The upper section optics 23 includes a mirror 52 to reflect the image to a further lens 55 and to a first beam splitter 56. The two images are projected to a second beam splitter 57. The superimposition of the two images is then reflected from a mirror 54 to the eyepiece 50 and to a screen 58. The position of the image associated with the projected last frame can be adjusted by the horizontal movement of the stereo base lens 49. When the image projected from the first and last frames are adjusted in the horizontal and vertical positions, the desired stereo base position is set. The stereo base position is determined with a tolerance of $10^{-4}$ inches. The stereo base position is the distance between the first and last frame image projections. This distance can be varied by the operator in order to adjust the optical center-to center distance between all the image frames. By adjusting the stereo base distance the operator can cause different parts of the subject image to appear in "front" or "behind" the optical viewing plane in the final assembled stereographic product.

In operation a multi-objective lens camera such as that shown in FIG. 21 simultaneously photographs the subject with the exposure time for each image being substantially equal to provide a film strip 83 having a plurality of subject images 91. The film is processed to provide a plurality of sets of groups of frames, each group having a number of frames equal to the number of lenses in the camera. The film strip 83 is placed on the optical bench 12 such that the first and last frames are aligned for optical viewing when the carriage is in the starting position as determined by scale 89. The operator selects the desired aim point concentrating on the aesthetic composition of the subject and the film image being viewed. The separation between the plurality of frames varies in direct proportion to the subject to camera lens distance. The operator selects the desired stereo base distance by adjusting the stereo base lens 49 to superimpose the selected points on the first and last film frame, i.e., the homologous points, to establish the aim point. In a specific embodiment electronic control logic divides the stereo base distance by the number of frames less one, e.g., six to generate the center-to-center distance between each frame. The carriage assembly means 21 advances the film strip 83 in one-sixth increments and at each increment the electronic control logic generates a marking or coding signal which mechanically or optically marks the film frame 91. Each frame is marked successively by advancing the film the incremental distance. After marking the film is placed in a projection printing assembly comprising an enlarger 13 and a line grid apparatus 14 for registration according to the marking and exposure of each frame onto print paper 95. The print paper 95 is located in the line grid apparatus 14. After printing the paper 95 is further processed at 15 and a registered lenticular lens plate 96 is placed over the picture and the combination is laminated to produce the final three-dimensional picture at 16. As shown schematically in FIG. 19 the enlarger 13 includes an optical source 92 which projects through lens 93 a selected image frame 91 from the film 83 which has been mechanically or optically aligned by means 105. The film 83 is stored in a cassette 94 which has been removed from the camera 10 and processed at 11 and marked on the optical bench 12.

The film image frame 91 is projected towards a line grid 14. The line grid 14 comprises a movable line grid 97 which is divided into a plurality of opaque 98 and transparent 99 sections extending across the width of the grid in a repeating pattern. The basic repeating pattern has a width equal to the width of the base 100 of each lens 101 on the lenticular screen 96. The width of the transparent portion 99 of each basic repeating pattern is equal to the number of camera lenses, i.e., the number of simultaneously taken film frames, divided into the total width. For example, if there are seven lenses and the total width of the basic repeating pattern is 0.021 inches, then the width of the transparent portion 99 is 0.003 inches and the opaque portion 98 is 0.018 inches. The total number of the basic repeating pattern is equal to the total number of parallel lenses 101 on the lenticular viewing screen 96 of the final product. The line grid 97 is located between the enlarger 13 and the print paper 95.

In processing, each frame is printed onto the paper 95 and simultaneously across the entire grid 97 for the width of each of the transparent portions 99 of the repeating pattern. The film 83 is advanced and the grid 97 are each moved in the same direction in 0.003 inch increments so as to print simultaneously across the paper 95 each successive frame. Each of the image frames 91, for example, seven, is printed sequentially but for each lens 101 of the lenticular viewing screen 96. At the completion of the processing in the line grid 97 the paper 95 has a plurality of prints across the paper equal in number to the number of the lenses 101 on the lenticular viewing screen 96, the width of each print being equal to the base 100 of each lens of the viewing screen and each print comprising each of the film images 91.

The print paper 95 is than processed to produce the photographed subject. The lenticular viewing screen 96 is placed over the picture so as to align each lens base 100 with a respective one of the now-developed repeating pattern, and laminated into a fixed position.

As used herein "paper" refers to the use of any photosensitive material either positive or negative. Any commercially available photosensitive film can be used to provide the plurality of images. Preferably the film should be dimensionally stable and an Estar based film is especially desirable if the marking is accomplished mechanically.

In another embodiment a selected film image 91 of the continuous strip 83 of film frame images is optically viewed through the upper section optics 23 and only one of the lenses of the lower section optics 22. Preferably the selected film frame is the first frame and the associated first frame lens 66. The operator selects a desired point in the film image according to the aesthetic composition of the subject and the film image being viewed. A parallax corrected cross-hair 50a located in eyepiece 50 is disposed over the selected film image so as to register the cross-hair with the chosen point. The cross-hair is position adjustable in framework 51 along two axes in the plane of the strip. The position of the cross-hair is fixed by clamping or locking of the position adjustment and the frame of the selected film image is marked. The strip is then advanced to select the corresponding point of a succeeding film frame image and the frame is marked. The corresponding point is selected by the positioned fixed cross-hair. Each of the film frame images is successively and sequentially moved to the cross-hair and the homologous point is registered with the cross-hair and the frame is marked. At the completion of the marking of the individual film frame images the aim point will be established. The marked continuous film strip is thereafter registered in the enlarger-line grid to print the stereoscopic photograph.

Instead of a continuous film strip, the method can be practiced using a plurality of separate film images provided from a plurality of cameras or from a plurality of camera positions. In this technique a selected film image frame is placed on the bench and the cross-hair is fixedly superimposed over the selected aim point. A second film image frame is inserted into the bench and viewed optically until the cross-hair determines the homologous point. The registration mark is then made on the second frame and the frame is removed. A third frame is inserted into the bench and the technique is repeated for each of the plurality of film image frames. The selected film image frame can also be marked and removed after fixing the location of the cross-hair of the optical viewing device.

The optical and physiological principles associated with viewing the assembled parallax stereogram, as shown in FIG. 20, are well-known. The viewing of a parallax stereogram is described in U.S. Pat. Nos. 3,482,913 and 3,504,059 and 3,508,920, in the name of W. E. Glenn, Jr.; and in U.S. Pat. No. 3,678,833 in the name of S. L. Leach. A suitable technique for registering and laminating the lenticular screen 96 and the print 95 is disclosed in U.S. Pat. No. 3,462,226 in the name of J. E. Huffaker. The entire description and disclosures of each of these U.S. patents is incorporated by reference to this application. In addition incorporated in this application by reference is the entire disclosure and description of application Ser. No. 864,759 filed concurrently herewith and assigned to the same assignee as the present application. Ser. No. 864,759 is directed to an enlarger 13 and line grid assembly 14 wherein each image frame 91 of the film 83 is mechanically or optically aligned means 105 for projection onto the print paper 95.

FIG. 21 shows a schematic view of one embodiment of a camera 10 for providing the film 83. The camera 10 comprises a plurality of objective lenses 102 having their respective optical axes 103 parallel to each other and coplanar. A suitably located common shutter 104 is mechanically or electrically activated simultaneously for each lens. The lenses are focused simultaneously by a common mechanism. The number of image frames wound onto the cassette 94 after exposure is made equal to the number of objective lenses. Incorporated in this application by reference is the entire disclosure and description of application Ser. No. 864,747 filed concurrently herewith and assigned to the same assignee as the present application. Ser. No. 864,747 is directed to a camera 10 having a plurality of objective lenses for the taking of photographs for use in the apparatus and method of the present application.

Various modifications and improvements may be made by one skilled in the art to the method and apparatus disclosed herein without departing from the scope of the invention as defined by the claims. For example, as disclosed above the incremental relative movement between the film direction and the line grid is such that the grid is moved in the same direction as the film while the paper is stationary. Alternatively the grid may be stationary and the incremental relative movement provided by moving the paper in the direction opposite to that of the film.

What is claimed is:

1. A method for processing a plurality of film frames in excess of two for use in sterogram each frame having an image of the same subject, comprising the steps of
    establishing a stereo base by measuring the center to center distance between identical points in a selected pair of the film frame images, and
    marking each film frame or image with a mark according to the stereo base by dividing the stereo base by the number of the plurality of film frame images minus one in order to determine the location of the mark.

2. A method according to claim 1 wherein the film image is a continuous strip of simultaneously exposed film, the exposure time for each image being substantially equal.

3. A method according to claim 1 wherein the stereo base is determined by optical superimposition of the selected pair of film images.

4. A method according to claim 2 wherein the stereo base is determined according to the visual appearance of the pair of film images when optically superimposed.

5. A method according to claim 1 wherein the selecting of the two points determines an aim point.

6. A method according to claim 1 wherein the selected pair of film images is the first and last image frames.

7. A method according to claim 1 wherein the marking of the frame of each film image is performed sequentially.

8. A method according to claim 1 wherein the marking is performed by advancing the film frame images to a marking means.

9. A method according to claim 2 wherein the marking is performed by advancing the film frame images to a marking means.

10. A method according to claim 7 wherein the marking is performed by advancing the film frame images to a marking means.

11. A method according to claim 1 wherein the marking is accomplished mechanically.

12. A method according to claim 11 wherein the marking is accomplished by a punch in each frame of the film image.

13. A method according to claim 1 wherein the marking is accomplished by removing a portion of each frame of the film image.

14. A method according to claim 1 wherein the marking is accomplished by changing the opacity of the frame of each film image.

15. A method according to claim 1 wherein the marking is accomplished optically.

16. A method according to claim 15 wherein the marking is accomplished by a laser removing an emulsion portion of the photosensitive material of each frame of the film image.

17. A method according to claim 15 wherein the marking adds base density to the emulsion portion of the photosensitive material of each frame of the film image.

18. A method according to claim 1 wherein each frame of the film is marked a distance from any other frame as a multiple of the desired stereo base.

19. A method according to claim 1 wherein there is seven film images.

20. A method according to claim 18 wherein there is seven film images.

21. A method according to claim 1 wherein the marks are used to locate and project each film frame for printing onto photosensitive material.

22. A method according to claim 21 wherein the same size image on each film frame is printed.

23. A method according to claim 21 wherein the print is mounted in an optical viewer.

24. A method according to claim 23 wherein the optical viewer is a transparent member having a plurality of parallel lenticular elements.

25. A method according to claim 24 wherein each lenticular element is superimposed on a portion of each printed film image.

26. A method according to claim 25 wherein the portion is determined by the number of film images.

27. A method according to claim 25 wherein the portion is determined by dividing the base width of each lenticular element by the number of film images.

28. A method for processing a plurality of film frames in excess of two for use in a sterogram, each film frame having an image of the same subject, comprising the steps of
selecting a first point in a selected film frame image, marking the selected film frame or image with a mark according to the selected point,
selecting homologous points in each of the plurality of film frame images, and
marking each film frame or image, with a respective mark according to the homologous points.

29. A method according to claim 28 wherein the marks are used to locate and project each film frame for printing onto photosensitive material.

30. A method according to claim 29 wherein the print is mounted in an optical viewer.

31. A method according to claim 28 wherein the plurality of film frame images are in a continuous strip.

32. A method according to claim 28 wherein the film images are simultaneously exposed film, the exposure time for each image being substantially equal.

33. A method according to claim 28 wherein a first homologous point is determined from a selected film frame image, fixing the location and position of the first homologous point, and
sequentially advancing the strip to select the homologous point for each subsequent film frame image according to the first homologous point.

34. A method according to claim 28 wherein the center to center distance between a selected homologous point on each film frame image is equal.

35. A method according to claim 28 wherein the selecting of an homologous points determines the aim point.

36. A method according to claim 33 wherein the selecting of an first homologous point determines the aim point.

37. A method according to claim 28 wherein the marking of the frame of each film image is performed sequentially.

38. A method according to claim 28 wherein the marking is performed by advancing the film frame images to a marking means.

39. A method according to claim 28 wherein the marking is accomplished mechanically.

40. A method according to claim 39 wherein the marking is accomplished by a punch in each frame of the film frame image.

41. A method according to claim 28 wherein the marking is accomplished by removing a portion of each frame of the film image.

42. A method according to claim 28 wherein the marking is accomplished by changing the opacity of the frame of each film image.

43. A method according to claim 28 wherein the marking is accomplished optically.

44. A method according to claim 43 wherein the marking is accomplished by a laser removing an emulsion portion of the photosensitive material of each frame of the film image.

45. A method according to claim 43 wherein the marking adds base density to the emulsion portion of the photosensitive material of each frame of the film image.

46. A method according to claim 28 wherein each frame of the film is marked a distance from any other frame as a multiple of the distance between the homologous points.

47. A method according to claim 33 wherein each frame of the film is marked a distance from any other frame as a multiple of the distance between the homologous points.

48. A method according to claim 28 wherein there are seven film images.

49. A method according to claim 29 wherein the same size image on each film frame is printed.

50. A method according to claim 30 wherein the optical viewer is a transparent member having a plurality of parallel lenticular elements.

51. A method according to claim 50 wherein each lenticular element is superimposed on a portion of each printed film image.

52. A method according to claim 51 wherein the portion is determined by the number of film images.

53. A method according to claim 51 wherein the portion is determined by dividing the base width of each lenticular element by the number of film images.

54. A product of the method claim 1.

55. A product according to the method of claim 28.

56. A product according to the method of claim 29.

57. A product according to the method of claim 21.

58. A product according to the method of claim 30.

59. A product according to the method of claim 23.

60. A product according to the method of claim 2.

61. A product according to the method of claim 11.

62. A product according to the method of claim 15.

* * * * *